United States Patent
Jones et al.

(10) Patent No.: US 10,664,120 B1
(45) Date of Patent: *May 26, 2020

(54) MEDIA ELEMENT NAVIGATION USING A VIRTUAL JOG WHEEL

(71) Applicant: GOOGLE LLC, Mountain View, CA (US)

(72) Inventors: Timothy Charles Jones, Huntingdon (GB); Jan Svarovsky, London (GB)

(73) Assignee: GOOGLE LLC, Mountain View, CA (US)

( * ) Notice: Subject to any disclaimer, the term of this patent is extended or adjusted under 35 U.S.C. 154(b) by 204 days.

This patent is subject to a terminal disclaimer.

(21) Appl. No.: 15/841,073

(22) Filed: Dec. 13, 2017

Related U.S. Application Data

(63) Continuation of application No. 13/612,258, filed on Sep. 12, 2012, now Pat. No. 9,870,114.

(51) Int. Cl.
*G06F 3/048* (2013.01)

(52) U.S. Cl.
CPC ..................... *G06F 3/048* (2013.01)

(58) Field of Classification Search
CPC ........... G06F 3/048; G09G 5/377; G09G 5/34
See application file for complete search history.

(56) References Cited

U.S. PATENT DOCUMENTS

| | | | | |
|---|---|---|---|---|
| 7,710,393 B2* | 5/2010 | Tsuk | ...................... | G06F 1/1626 345/156 |
| 8,552,988 B2* | 10/2013 | Battles | ................ | G06F 3/03547 178/18.01 |
| 2003/0095096 A1* | 5/2003 | Robbin | ................. | G06F 1/1626 345/156 |
| 2004/0239692 A1 | 12/2004 | Balle et al. | | |
| 2007/0080938 A1 | 4/2007 | Robbin et al. | | |
| 2007/0097086 A1* | 5/2007 | Battles | ................. | G06F 3/03547 345/173 |
| 2008/0062137 A1* | 3/2008 | Brodersen | ........... | G06F 3/04883 345/173 |
| 2008/0065722 A1 | 3/2008 | Brodersen et al. | | |
| 2008/0126981 A1 | 5/2008 | Candrian et al. | | |
| 2009/0024923 A1* | 1/2009 | Hartwig | .................. | G06F 16/70 715/716 |
| 2010/0231537 A1* | 9/2010 | Pisula | .................... | G06F 3/0481 345/173 |
| 2010/0251164 A1* | 9/2010 | Karan | .................... | G06F 3/0481 715/782 |
| 2011/0239155 A1* | 9/2011 | Christie | .................. | G06F 3/044 715/784 |
| 2012/0030626 A1 | 2/2012 | Hopkins et al. | | |
| 2012/0089910 A1 | 4/2012 | Cassidy | | |
| 2012/0200598 A1* | 8/2012 | Yoshimi | .............. | G06F 3/03547 345/629 |
| 2015/0091881 A1* | 4/2015 | Onaka | .................... | G06F 3/0362 345/184 |
| 2017/0180673 A1* | 6/2017 | Hyun | .................... | H04N 5/4403 |

\* cited by examiner

*Primary Examiner* — Jeanette J Parker
(74) *Attorney, Agent, or Firm* — Lowenstein Sandler LLP

(57) ABSTRACT

A virtual jog wheel for navigating a set of media elements is disclosed. A graphical user interface including the virtual jog wheel and a set of media elements is provided. A command from a user corresponding to a rotational movement of a touch object relative to the virtual jog wheel is identified. In response to the command, a user may navigate from a first position in a first media element of the set of media elements to a second position in a second media element of the set of media elements.

20 Claims, 7 Drawing Sheets

SINGLE MEDIA ELEMENT
SCRUB MODE

CHOOSE MEDIA
ELEMENT MODE

FIGURE 5

500 

Provide, on a user device, a graphical user interface including a virtual jog wheel
510

Generate a composite navigatable set of media elements including multiple media elements
520

Receive a command based on a rotational movement of a touch object relative to the virtual jog wheel
530

Present to the user, via the graphical user interface, a result of the command, wherein the result includes navigating from a first position in a current media element to a second position in a different media element
540

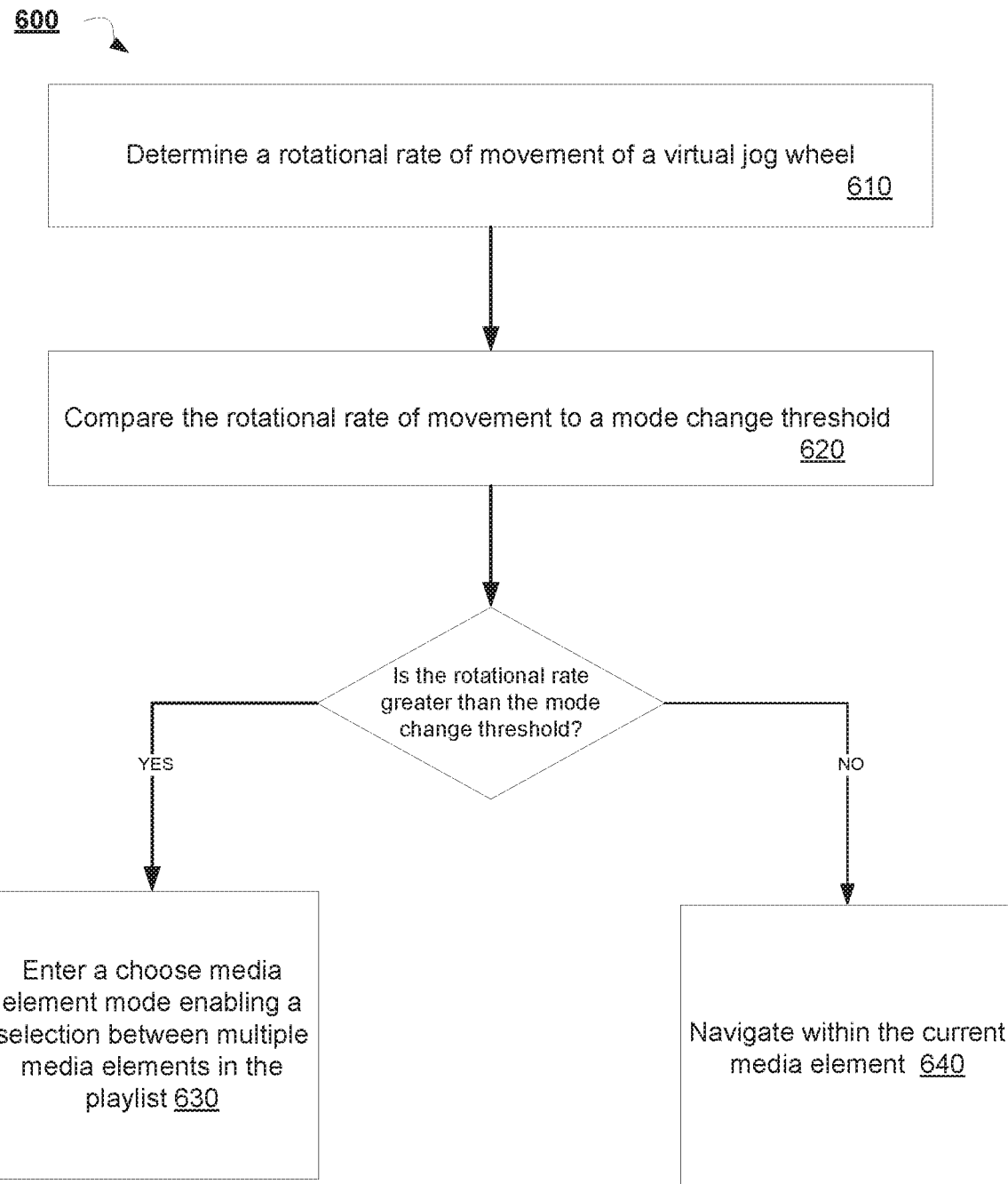

MEDIA ELEMENT NAVIGATION USING A VIRTUAL JOG WHEEL

CROSS-REFERENCE TO RELATED APPLICATIONS

This continuation application claims priority to U.S. patent application Ser. No. 13/612,258 filed on Sep. 12, 2012 the entire content of which is incorporated herein by reference.

TECHNICAL FIELD

The present disclosure relates to the field of graphical user interfaces, more particularly, to navigation of media elements using a virtual jog wheel presented via a graphical user interface.

BACKGROUND

Users watching videos, viewing images, or listening to music on a computing device (e.g., a mobile phone or a tablet) often have the desire to change a current position in the playback of the underlying content (e.g., the video, photos, or audio). The current playback position within the media (i.e., the playback position) is often controlled by a user via an interaction with a slider bar (i.e., a seek-slider bar or a time scrubbing bar) whereby a user may change a current playback position by moving or sliding an indicator or pointer along the slider bar to a new playback position. Certain touchscreen-based slider bars are horizontally arranged and require a user to move a touch object (e.g., a finger) in a vertical direction in order to control the scrubbing speed (e.g., the rate of movement of a pointer corresponding to a playback position).

Frequently, multiple media elements (e.g., individual audio and/or video files) are presented to the user in a playlist. In such instances, the user may use a slider bar to control the playback position within a single media element in the playlist, but may not interact with the slider bar to switch the playback position among the multiple media elements.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

A system and method are presented for providing a graphical user interface including a virtual jog wheel for use in navigating a set of media elements (e.g., an audio file, video file, image file, etc.). The virtual jog wheel is configured to identify a command corresponding to a rotational movement of a touch object relative to the virtual jog wheel. In response to the command, the virtual jog wheel causes a navigation from a first position in a first media element of the set of media elements to a second position in a second media element of the set of media elements. In an implementation, a graphical user interface is provided which includes a virtual jog wheel configured to control a playback position of a set of media elements. The virtual jog wheel is controlled by a virtual jog wheel controller configured to determine a rotational rate of movement of a virtual jog wheel in response to an interaction with a touch object. The rotational rate of movement of the virtual jog wheel is compared to a threshold, and a mode is entered which enables the user to select a media element from the set of media elements when the rotational rate of movement of the virtual jog wheel is greater than or equal to the threshold.

In additional embodiments, computing devices for performing the operations of the above described embodiments are also implemented. Additionally, in implementations of the disclosure, a computer readable storage media stores methods for performing the operations of the above described embodiments.

BRIEF DESCRIPTION OF THE DRAWINGS

The present disclosure will be understood more fully from the detailed description given below and from the accompanying drawings of various embodiments of the disclosure.

FIG. 5 is a flow diagram illustrating one implementation of a method for switching between multiple modes of a virtual jog wheel, in accordance with an implementation of the present disclosure.

FIG. 6 illustrates an exemplary graphical user interface including a multi-mode virtual jog wheel, in accordance with one implementation of the present disclosure.

DETAILED DESCRIPTION

A system and method for providing a virtual jog wheel to a user via a graphical user interface (GUI) for controlling a playback location of one or more media elements in a set of media elements (e.g., a playlist) are described. A virtual jog wheel is a GUI component graphically illustrating a jog wheel that can be moved (e.g., in a clockwise or counter-clockwise direction) in response to user input. As used herein, the media elements may include, but are not limited to, any suitable media type such as audio, video, and/or images. In an embodiment, the virtual jog wheel is displayed in a dial-like arrangement configured to receive a command from the user based on a rotational rate of a touch object (e.g., a finger, pointing device, or a stylus) relative to the virtual jog wheel. The virtual jog wheel is controlled by a virtual jog wheel controller configured to respond to the received command and re-position a playback location represented by an indicator (also referred to as a "time scrubber") on a time display (e.g., a slider bar) corresponding to one or more media elements.

In an embodiment, the virtual jog wheel controller is configured to transition the virtual jog wheel into multiple modes. When the virtual jog wheel is in a first mode of operation, a user may interact with the virtual jog wheel to navigate within a single media element (also referred to as a "single media element scrub mode"). In a second mode, the user may switch from one media element to another media element within a playlist (also referred to as a "choose media element" mode). In an implementation, the virtual jog wheel controller transitions from the single media element scrub mode to the choose media element mode based on a rate of rotation of a touch object relative to the virtual jog wheel.

In an implementation, the virtual jog wheel controller is configured to calculate an acceleration and/or deceleration of a rotational velocity of the virtual jog wheel and adjust a rate of movement of the time scrubber.

Figure 1:
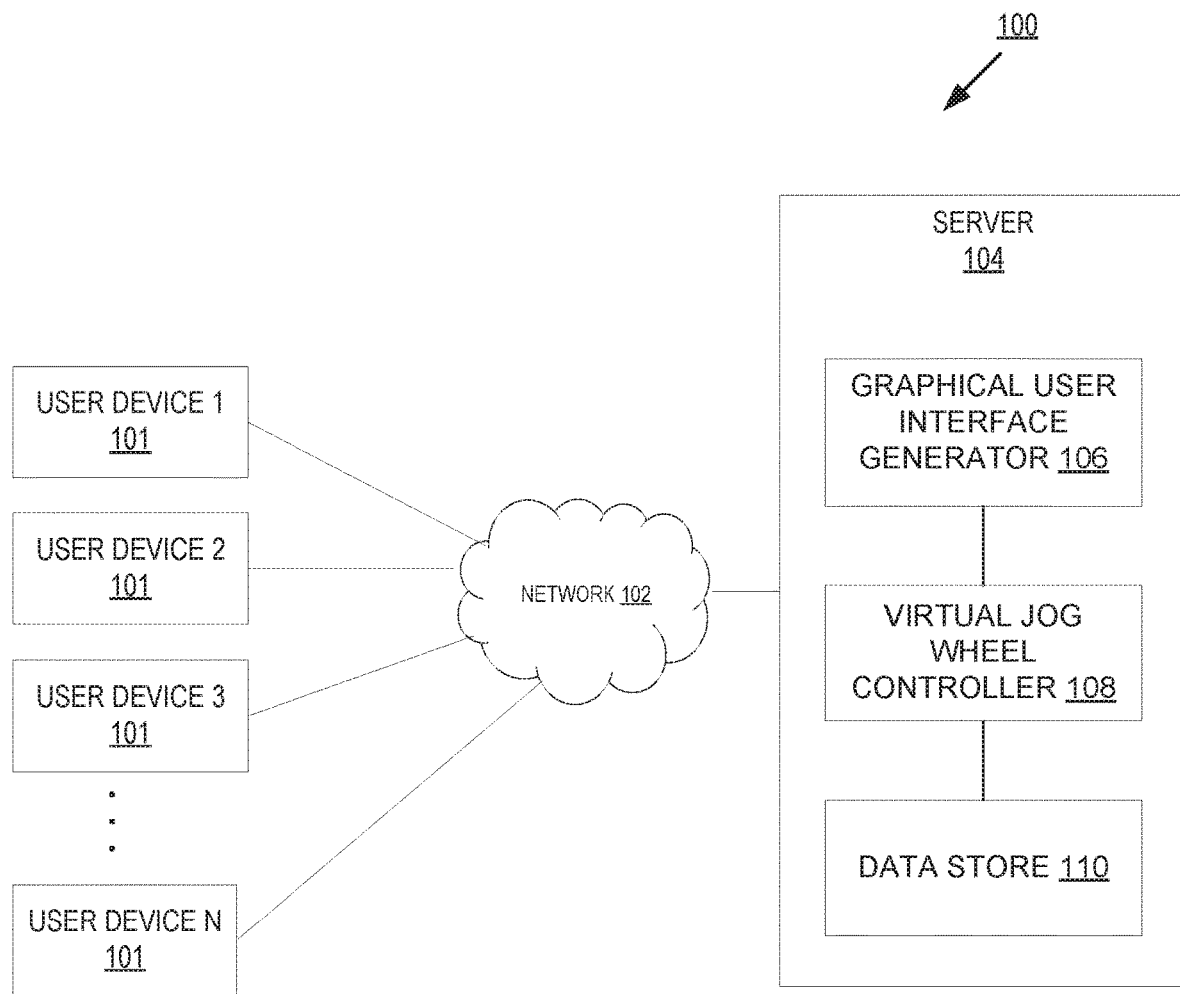
FIG. 1 illustrates an exemplary system architecture, in accordance with one implementation of the present disclosure.

FIG. 1 illustrates an exemplary system architecture 100, in accordance with one implementation of the present disclosure, including a server 104 configured to generate and provide a GUI including a virtual jog wheel for display on one or more user devices 101 (e.g., User Device 1, User Device 2, User Device 3, . . . User Device N shown in FIG. 1). The server 104 may include any suitable computing device including a processing device, such as, for example, a desktop computer, a portable digital assistant, a mobile phone, a laptop computer, a portable media player, a tablet computer, a netbook, a notebook, or a personal computer). The one or more user devices 101 are in communication with the server 104 via a network 102. The network 102 may comprise the Internet in one embodiment. In other embodiments, other networks, wired and wireless, such as an intranet, local area network (LAN), wide area network (WAN), cellular network, or broadcast network may be used.

The server 104 may also include a data store 110. The data store 112 may be hosted by any suitable memory or data storage device, including a non-transitory computer readable storage medium, such as, but not limited to, any disk including floppy disks, optical disks, CD-ROMs, and magnetic-optical disks, read-only memories (ROMs), random access memories (RAMs), EPROMs, EEPROMs, magnetic or optical cards, etc. The data store 110 may be configured to store one or more media elements and/or playlists to be provided to user devices 101. It is noted that the data store 110 may be any datastore accessible by the server 104, including, for example, a repository coupled to the server 104 via a network or a local memory of the server 104.

The server 104 is configured to execute a graphical user interface (GUI) generator 106 that may be implemented in hardware, software, firmware, or any combination of the above. In an implementation, the graphical user interface generator 106 is configured to generate a GUI including a virtual jog wheel for presentation via a display of the user devices 101.

The server 104 is also configured to execute a virtual jog wheel controller 108 that may be implemented in hardware, software, firmware, or any combination of the above. In an implementation, the virtual jog wheel controller 108 is configured to control the virtual jog wheel and perform actions in response to commands received from the user via interactions (e.g., touching, pressing, and/or moving the virtual jog wheel) with the virtual jog wheel.

The user devices 101 may be any type of computing device (e.g., a tablet, mobile device, computer, etc.) including an interface for displaying the generated GUI including the virtual jog wheel to a user. For example, the user devices 101 may any device including a processing device (e.g., a processor), a computer-readable medium, and a memory.

In an implementation, the graphical user interface generator 106 may alternatively reside on the server 104 and the virtual jog wheel controller 108 may reside on the user device(s) 101 or both the graphical user interface generator 106 and the virtual jog wheel controller 108 may reside on the user device(s) 101. It is noted that any suitable arrangement may be employed such that the graphical user interface generator 106 and/or the virtual jog wheel controller 108 may perform the functions described in detail below in connection with FIGS. 4 and 5.

In some implementations, the user device 101 includes a browser application or other application configured to communicate over a network (not shown) using, for example, Internet related protocols (e.g., TCP/IP and HTTP) with the server 104. The GUI may be transmitted for display on the user device 101 from a remote server 104 via the network 102.

In yet another implementation, the graphical user interface generator 106 may be installed on the user device 101 and the virtual jog wheel controller 108 may be remotely located and in communication with the graphical user interface generator 106 via the network 102.

In an implementation, the interface of the user device 101 is a touchscreen configured to receive commands from a user via a touch object (e.g., a finger, pointing device, stylus, etc.). In another implementation, the interface of the user device 101 is a non-touchscreen display, wherein a user interacts with the virtual jog wheel via a pointing device (e.g., a keyboard, mouse, joystick, etc.).

Implementations of the server 104 may operate within a single server device, within multiple server devices, or in part within the user device 101 and one or more server devices. Although each of the graphical user interface generator 106 and the virtual jog wheel controller 118 are depicted in FIG. 1 as disparate components, these components may be combined into a single component and implemented together and/or networked in various combinations of multiple different devices that operate together. Examples of devices may include, but are not limited to, servers, mainframe computers, networked computers, process-based devices, and similar types of systems and devices. For example, in an implementation, the graphical user interface generator 106 and the virtual jog wheel controller 118 may be combined into a single component configured to perform the functionality described herein with respect to each individual component.

Figure 2:
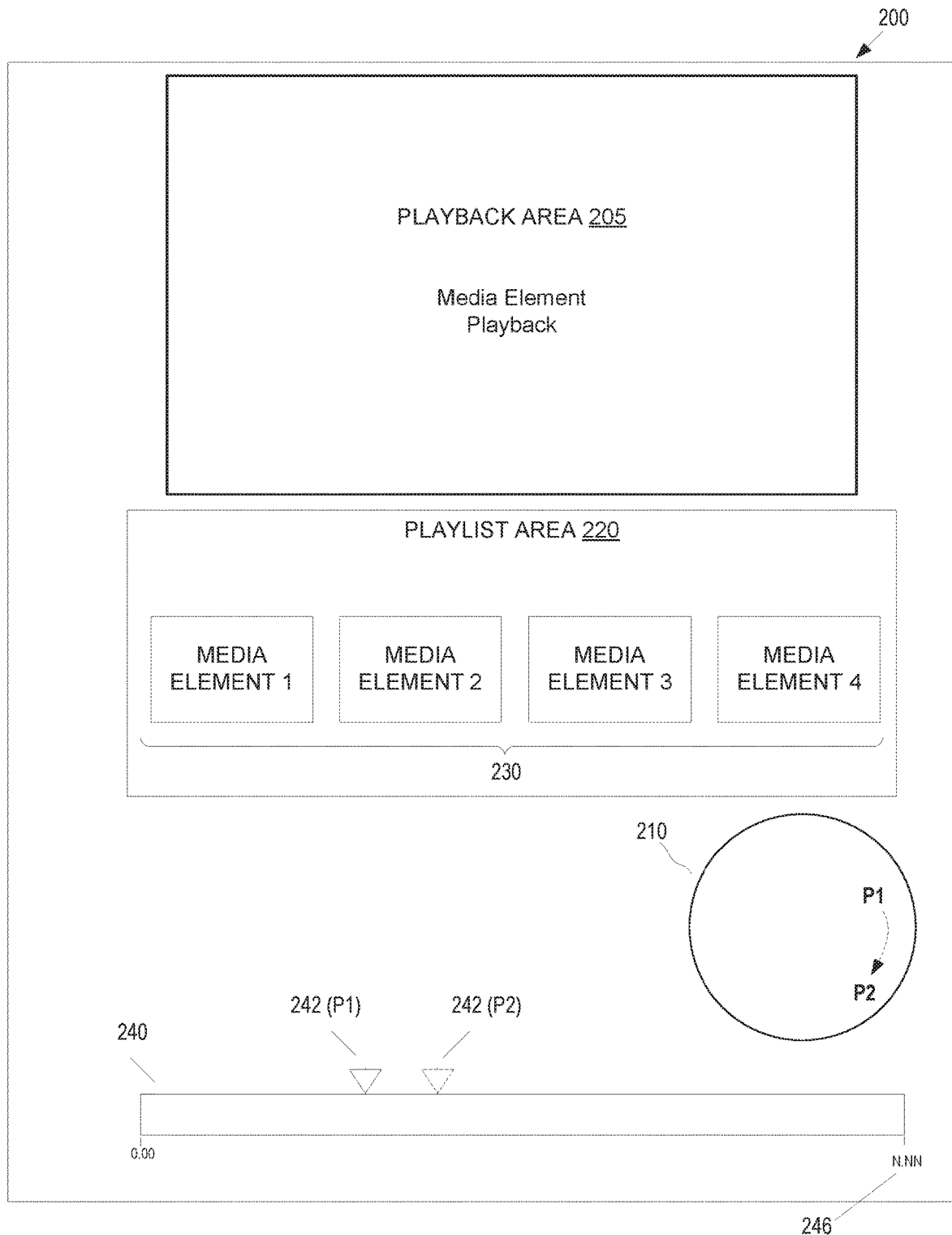
FIG. 2 illustrates an exemplary graphical user interface including a virtual jog wheel, in accordance with one implementation of the present disclosure.

FIG. 2 illustrates exemplary graphical user interface (GUI) 200 including a virtual jog wheel 210 generated by the graphical user interface generator 106 of a user device (e.g., user device 101 of FIG. 1). The virtual jog wheel 210 is a GUI element configured to receive user commands (e.g., playback, selection, etc.) relating to a media element (e.g., Media Element 1, Media Element 2, Media Element 3, and Media Element 4 presented to the user in a playlist area 220).

The virtual jog wheel 210 may have any suitable shape, such as, for example, the substantially circular shape (e.g., a dial) shown in the example illustrated in FIG. 2. The virtual jog wheel 210 is configured to virtually rotate or move in response to a movement of a touch object (e.g., a finger) relative to the virtual jog wheel. In an implementation, the virtual jog wheel 210 translates the movement of the touch object into movement of an indicator 242 (also referred to as time scrubber 242) of a slider bar 240.

In an implementation, the slider bar 240 is mapped to a linear control of a current playback position (indicated by the time scrubber 242) of one or more media elements being played back. The slider bar 240 may be positioned or displayed in any position or area within the GUI 200 and may include a line representing a total time for playing one or more media elements and the actual total time 246 for playing the one or more media elements (e.g., total time "N.NN" shown in FIG. 2). In an implementation, the GUI 200 displays an indication of a portion of the one or more media elements has been played (e.g., an indication of the amount of time of the media element that has been played) and an indication of how much of the one or more media elements are contained within the cache or buffer of the user device 101 (e.g., a bar or other indication which indicates how much of the media element has been downloaded and is available for playback).

The movement of the time scrubber 242 is controlled by the virtual jog wheel 210. For example, a touch object (not shown) may make an initial detectable contact (or other interaction) with the virtual jog wheel 210 at a first position ("P1") and slide, swipe or move along the virtual jog wheel 210 in a clockwise direction (denoted by the dashed action arrow in FIG. 2) to a second position ("P2"). The movement by the touch object relative to the virtual jog wheel 210 represents a command from the user which is processed by the virtual jog wheel controller and translated into a corresponding movement of the time scrubber 242 from a first position (denoted by the time scrubber 242 (P1)) to a second position (denoted by the dashed-line time scrubber 242 (P2)).

In an implementation, the multiple media elements of a playlist (e.g., Media Element 1, Media Element 2, Media Element 3, and Media Element 4 presented to the user in a playlist area 220) may be concatenated to form a composite navigatable set of media elements 230. In an implementation, the multiple media elements may be concatenated into a composite set of media elements for navigation by a user by the graphical user interface generator 106 or the virtual jog wheel controller 108 of FIG. 1. By generating a composite set of media elements, the user is able to navigate the composite set as a single entity, and may navigate from a first position within a first media element of the set of media elements to a second position in a second media element of the set of media elements using a single time slider 240 and a single time scrubber 242.

Figure 3A:
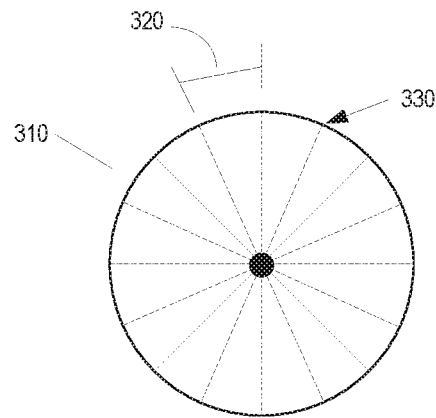
FIGS. 3A-3C illustrates multiple implementations of a virtual jog wheel.

With reference to FIG. 3A, in an implementation, a virtual jog wheel 310 is divided into a number of divisions 320. The division 320 granularity may be varied programmatically such that the virtual jog wheel 310 may include any suitable number of divisions (e.g., 10 divisions, 50 divisions, 100 divisions, etc.) divided evenly over the 360 degree movement of the virtual jog wheel 310. In the example shown in FIG. 3A, the virtual jog wheel 310 is divided into 16 divisions 320.

Optionally, as the virtual jog wheel 310 is rotated, haptic or tactile feedback (e.g., a mechanical stimulation such as a vibration or pulse) is used to give the touch object a sensation of the movement over or across a division boundary 330. In operation, as the virtual jog wheel 310 moves over or across a division boundary 330, the time scrubber (e.g., time scrubber 242 in FIG. 2) moves a corresponding unit or interval of time along the slider bar (e.g., the slider bar 240 in FIG. 2).

In an implementation, the movement over a division boundary 330 may correspond to any designated unit of time. For example, the crossing of a division boundary 330 may correspond to a half second movement of time along the slider bar 240, a one second movement of time along the slider bar 240, a five second movement of time along the slider bar 240, etc. In an implementation, the graphical user interface generator 106 may display the slider bar 240 (if it is not already displayed) in response to an interaction with the virtual jog wheel by the touch object (e.g., a swipe or tap).

As shown in FIG. 2, the GUI 200 may include a playback area 205 configured to present and playback a media element (e.g., a video file, an audio file, an image file). The GUI 200 may further include a playlist area 220 configured to provide a playlist of media elements (e.g., Media Element 1, Media Element 2, Media Element 3, and Media Element 4). In an implementation, each media element in the set of media elements may be represented in the playlist in any suitable format, such as, for example, a link or an image (e.g., a thumbnail). In an implementation, the multiple media elements provided in the playlist area 220 may be concatenated to form a composite set of media elements 230 that may be navigated as a single media element. In this implementation, when a user scrubs to the end of a first media element within the set of media elements, the scrubbing action continues into a next media element based on the movement of the virtual jog wheel 210.

In one example, multiple time sliders 240 are displayed corresponding to the multiple media elements of the composite set. In this example, the time scrubber 242 may jump or move from one time slider 240 to another to illustrate a switch to the next media element in the set of media elements. In another example, the time slider 240 may cover the composite set of media elements and the total time 246 may represent the actual time for playing the composite set of media elements. It is noted that the time slider 240 may extend beyond an initial viewing area of the GUI 200 (e.g., with the time slider 240 extending outside of the initial viewing area presented by the GUI 200) and, as such, the GUI 200 would be configured to pan left and right to maintain the time scrubber 242 marking the current position on the viewable portion of the time slider 240.

In an implementation, the virtual jog wheel 210 is configured such that the time interval moved on the time slider 240 for each "click" or passage of a division boundary 330 may increase as a function of the rotational rate (e.g., velocity) of the virtual jog wheel 210. The rotational rate of movement of the virtual jog wheel 210 may be calculated by the number of divisions 320 traversed per unit of time (e.g., millisecond). In an implementation, the virtual jog wheel controller 108 is configured to calculate the rotational velocity of the virtual jog wheel 210 and compare the rotational velocity to an acceleration threshold (e.g., a predefined rotational velocity value). If the rotational velocity exceeds the acceleration threshold, the time interval corresponding to movement of the time scrubber 240 per each division 320 of the virtual jog wheel 210 increases by an acceleration amount. For example, the time interval of the media element that is moved for each division of the virtual jog wheel may be 1 second when the virtual jog wheel is operated at a first rotational velocity. The time interval spanned may increase to 5 seconds per division if the rotational velocity is increased and exceeds the acceleration threshold). It is noted that the virtual jog wheel 210 and virtual jog wheel controller 108 may be configured to operate in accordance with any number of acceleration thresholds and associated threshold values. It is further noted that the acceleration amount may be varied programmatically. For example, the speed of the time scrubber 240 may be doubled each time an acceleration threshold is crossed.

In an implementation, the virtual jog wheel 210 is configured such that the time interval moved on the time slider 240 for each click or passage of a division boundary 330 may decrease as a function of the rotational velocity of the virtual jog wheel 210. The virtual jog wheel controller 108 may be configured to compare the rotational velocity of the virtual jog wheel 210 to a deceleration threshold (e.g., a predefined rotational velocity value). If the rotational velocity falls below the deceleration threshold, the time interval corresponding to movement of the time scrubber 240 per each division 320 of the virtual jog wheel 210 decreases by a deceleration amount. For example, the time interval of the media element that is moved for each division of the virtual jog wheel may be 5 seconds when the virtual jog wheel is operated at a first rotational velocity. The time interval spanned may decrease to 1 second per division if the rotational velocity is decreased and falls below the deceleration threshold. It is noted that the virtual jog wheel 210 and virtual jog wheel controller 108 may be configured to operate in accordance with any number of deceleration thresholds and associated threshold values. It is further noted that the deceleration amount may be varied programmatically. For example, the speed of the time scrubber 240 may be cut in half each time a deceleration threshold is crossed.

In an implementation, if the movement of the virtual jog wheel 210 is stopped or the touch object is no longer in contact with the virtual jog wheel 210, then playback of the media element may automatically begin or resume at the current playback position indicated by the time scrubber 240.

In an implementation, movement of the virtual jog wheel 210 in a clockwise direction increases the time scrubber 242 along the time display 240 (e.g., the playback position of the media element is moved forward). In addition, in this implementation, movement of the virtual jog wheel 210 in a counterclockwise direction decreases the time scrubber 242 along the time display 240 (e.g., the playback position of the media element is moved backward or rewound).

Figure 3B:
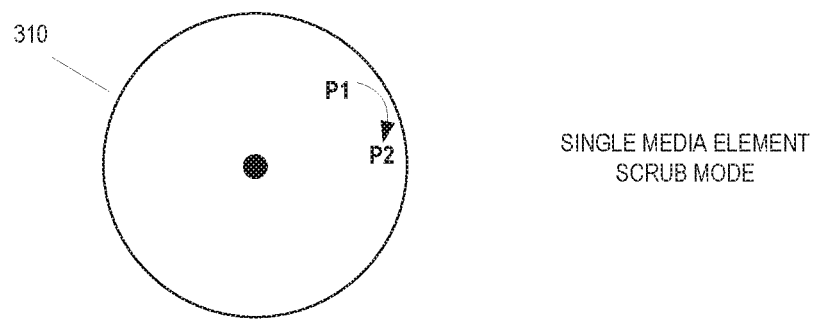
Figure 3C:
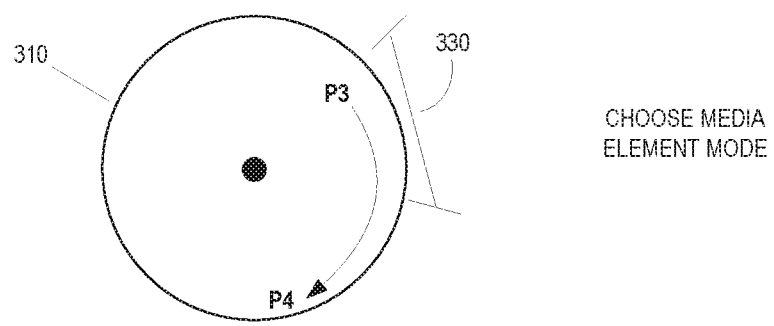

FIGS. 3B and 3C illustrates an implementation of the virtual jog wheel 310 having multiple states or modes. With reference to FIG. 3B, the virtual jog wheel 310 may be configured to operate in a first mode which enables a user to navigate within a single media element (also referred to as a "single media element scrub mode"). In an implementation, the single media element scrub mode is a default mode of the virtual jog wheel. In an implementation, if a user operates a touch object from a first position (P1) to a second position (P2) at a rotational velocity below a certain threshold (also referred to as a "mode change threshold") the virtual jog wheel 310 remains in the single media element scrub mode.

Figure 4:
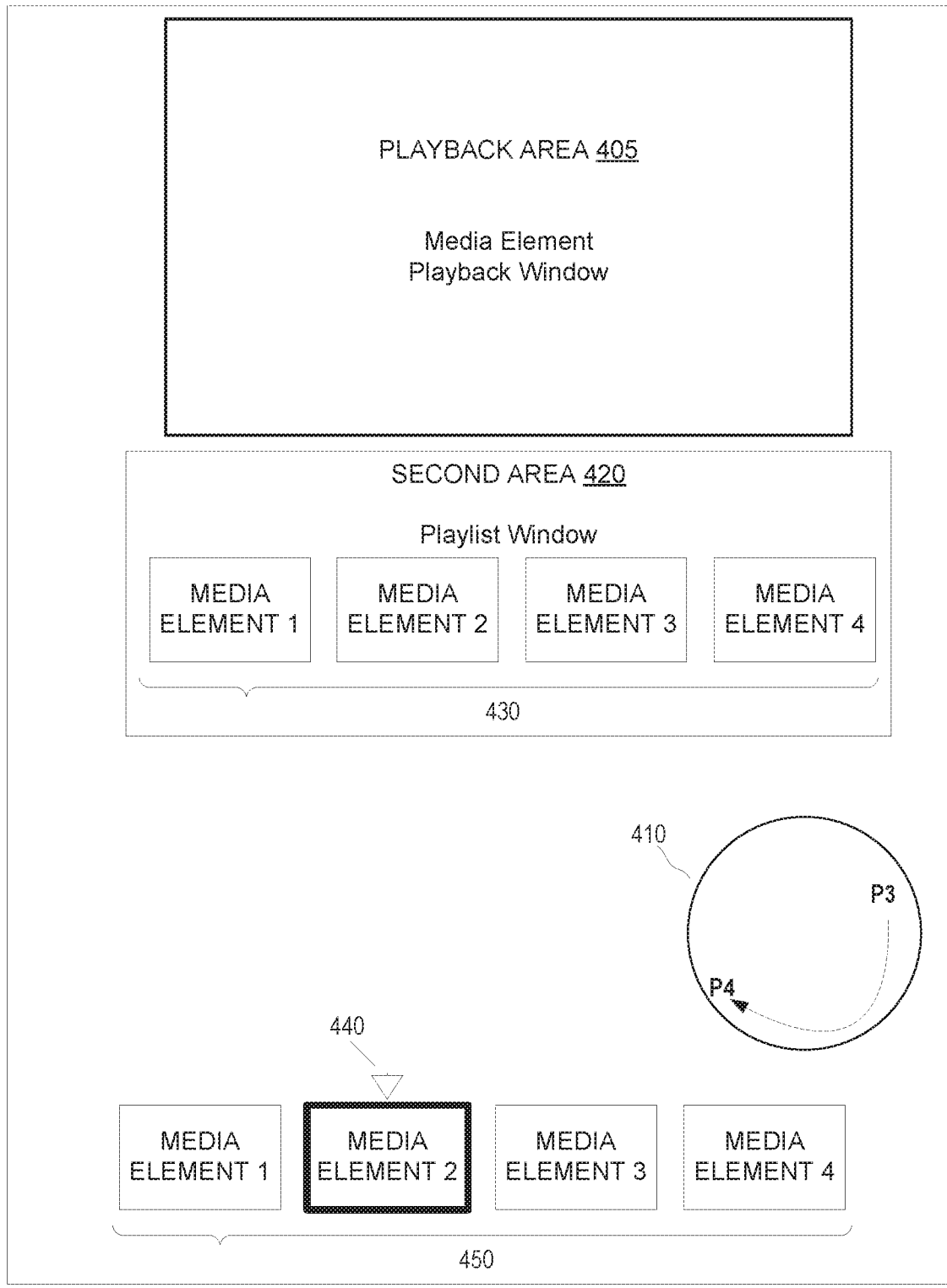
FIG. 4 is a flow diagram illustrating one implementation of a method for navigating between multiple media elements in a playlist, in accordance with an implementation of the present disclosure.

With reference to FIGS. 3C and 4, if the user operates a touch object from an initial position (P3) to a new position (P4) (e.g., over a same period of time but a bigger distance) such that the rotational velocity exceeds the mode change threshold, then the virtual jog wheel 310 shifts into a second mode which enables the user to switch from one media element to another (also referred to as a "choose media element" mode). In an implementation, in the choose media element mode, the time display (shown in FIG. 2) is replaced by a listing of images or thumbnails 450 each representing a media element within the set of media elements 430. The current or selected media element may be graphically indicated, such as, for example, by a time scrubber 440 and/or the current media element may be highlighted with a darker border, as shown in FIG. 4.

In the choose media element mode, the rate of rotation of the virtual jog wheel 410 determines the rate of switching between the media elements. In an implementation, as the user decelerates or slows down the rate of rotation of the touch object relative to the virtual jog wheel 410, the virtual jog wheel controller switches back into the single media element scrub mode for scrubbing/navigating within a selected media element. In an implementation, if the selected media element is the original media element (e.g., the media element that the user was navigating at the time of the switch to the choose media element mode), then the playback resumes at the same playback point as it was when the mode switch occurred. If the selected media element is different than the initial media element (e.g., the media element prior to the mode switch), then the time scrubber is placed at the beginning of the selected media element.

In an implementation, once in the choose media element mode, the rate of rotation of the touch object/virtual jog wheel may be independent of the rate of switching between media elements. Advantageously, this allows the user to rotate the virtual jog wheel and select a media element from the list 450 without the speed of the rotation being used as a factor in the selection command. In this implementation, if the virtual jog wheel is rotated clockwise, the current media element will change to the next media element in the list 450 at a fixed rate (e.g., three changes per second). If the virtual jog wheel is rotated counterclockwise, the current media element will change to a previous media element in the list 450. In an implementation, when the touch object is in longer in contact with the virtual jog wheel 410, the virtual jog wheel 410 transitions into the single media element scrub mode. In an implementation, a separate button or actionable area presented on the GUI may be used to place the virtual jog wheel into the choose media element mode.

FIG. 5 illustrates a flow diagram of an implementation of a method 500 for using a virtual jog wheel to navigate among a set of media elements. The method is performed by processing logic that may include hardware (circuitry, dedicated logic, etc.), software (such as is run on a general purpose computer system or a dedicated machine), or a combination of both. In one implementation, the method 500 illustrated in FIG. 5 may be performed by the graphical user interface generator 106 and the virtual jog wheel controller 108 executed by the computer system 104 as described with respect to FIG. 1.

For simplicity of explanation, the method 500 is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the method 500 could alternatively be represented as a series of interrelated states via a state diagram or events. Additionally, it should be appreciated that method 500 disclosed in this specification is capable of being stored on an article of manufacture to facilitate transporting and transferring such methods to computing devices. The term article of manufacture, as used herein, is intended to encompass a computer program accessible from any computer-readable device or storage media.

At block 510 of method 500, a graphical user interface including a virtual jog wheel is provided on a user device (e.g., a touchscreen device such as a tablet or mobile phone). In an implementation, the graphical user interface is configured to present a user with a media player configured to playback a media element provided in a playlist including multiple media elements (e.g., video files, image files, audio files). At block 520, a composite navigatable set of media elements including the multiple media elements in the playlist is generated. In an implementation, the composite set of media elements is generated by concatenating the multiple media elements together to form a single entity presented on a time slider and navigatable by the virtual jog wheel.

In block 530, a command relative to the playback of the set of media elements is received from the user. The command may be based on a rotational movement of the virtual jog wheel based on an interaction with a touch object (e.g., a finger, stylus, etc.). The command may trigger any instructions relating to the playback of the set of media elements (e.g., pause, play, rewind, fast forward, skip, etc.). An exemplary command may trigger instructions to change a current playback position (represented by a time scrubber) within a first media element to a different playback position within a second media element.

In block 540, the command is executed, a result of the command execution is presented to the user via the GUI, wherein the result includes navigating from a first position in a current media element to a second position in a different media element. For example, the result that is displayed via the GUI may be the changing of an initial playback position in Media Element 1 to a new playback position in Media Element 3. In an implementation, the result of the command execution may be a fast forwarding from a first media element into any position within another media element. For example, the user may navigate to the starting point of a next media element or any position subsequent to the starting point of the next media element. In an implementation, the navigating may be achieved by switching the mode of the virtual jog wheel to the choose media element mode, as described above in connection with FIGS. 3C and 4. Advantageously, the user may use the virtual jog wheel to move among the multiple media elements of the playlist.

FIG. 6 illustrates a flow diagram of one embodiment of a method of controlling a playback position within one or more media elements using a virtual jog wheel. The method is performed by processing logic that may include hardware (circuitry, dedicated logic, etc.), software (such as is run on a general purpose computer system or a dedicated machine), or a combination of both. In one implementation, the method 600 illustrated in FIG. 5 may be performed by the graphical user interface generator 106 and the virtual jog wheel controller 108 executed by the computer system 104 as described with respect to FIG. 1.

For simplicity of explanation, the method 600 is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the method 600 could alternatively be represented as a series of interrelated states via a state diagram or events. Additionally, it should be appreciated that method 600 disclosed in this specification is capable of being stored on an article of manufacture to facilitate transporting and transferring such methods to computing devices. The term article of manufacture, as used herein, is intended to encompass a computer program accessible from any computer-readable device or storage media.

At block 610, a rotational rate of movement of a touch object relative to the virtual jog wheel is determined. In an implementation, the rotational rate of movement of the virtual jog wheel may be calculated by determining a number of divisions of the virtual jog wheel that are traversed per a unit of time (e.g., millisecond). It is noted that other suitable methods of calculating the rotational rate of the virtual jog wheel may be employed.

At block 620, the determined rotational rate of movement is compared to a threshold (also referred to as a "mode change threshold") to determine if the rotational rate is greater than the mode change threshold. If so, a choose media element mode is entered and movement of the virtual jog wheel results in a selection among multiple media elements in a playlist, in block 630. If the rotational rate is less than the mode change threshold, movement of the virtual jog wheel results in navigation within the current media element, in block 640.

Figure 7:
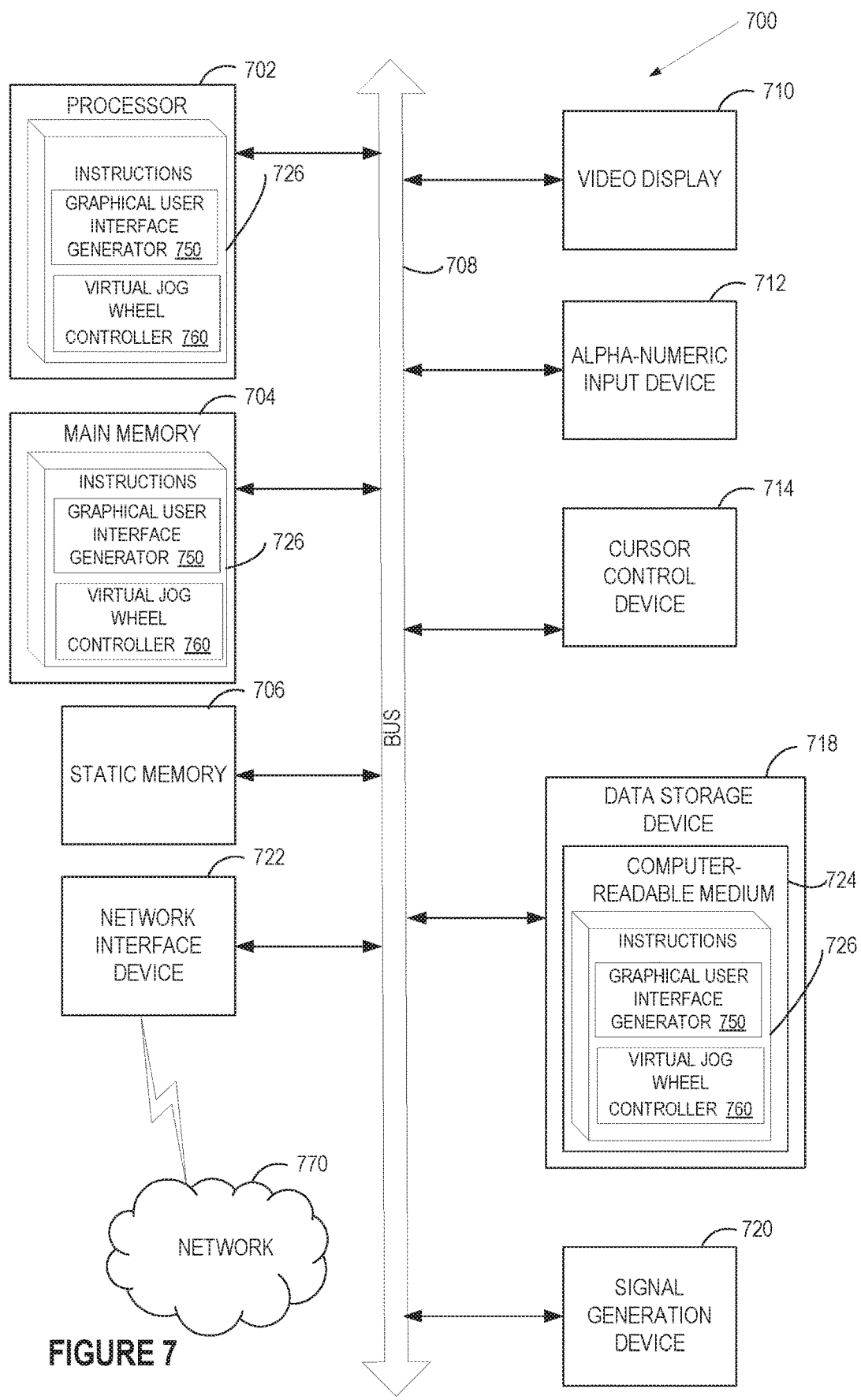
FIG. 7 is a block diagram of an exemplary computer system that may perform one or more of the operations described herein.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 for performing the operations and steps discussed herein, illustrated in FIG. 7 by depicting instructions 726 within processor 702.

The computer system 700 may further include a network interface device 722. The computer system 700 also may include a video display unit 710 (e.g., a liquid crystal display (LCD) or a cathode ray tube (CRT)) configured to present a GUI generated in accordance with implementations of the present disclosure, an alphanumeric input device 712 (e.g., a keyboard), a cursor control device 714 (e.g., a mouse), and a signal generation device 720 (e.g., a speaker).

The data storage device 718 may include a computer-readable storage medium 724 on which is stored one or more sets of instructions 726 (e.g., software) embodying any one or more of the methodologies or functions described herein. The instructions 726 may also reside, completely or at least partially, within the main memory 704 and/or within the processor 702 during execution thereof by the computer system 600, the main memory 704 and the processor 702 also constituting computer-readable storage media. The instructions 726 may further be transmitted or received over a network 770 via the network interface device 722.

In one embodiment, the instructions 726 include instructions for a graphical user interface generator 750 and/or a virtual jog wheel controller 760, which may respectively correspond to the graphical user interface generator 106 and/or a virtual jog wheel controller 108 of FIG. 1, and/or a software library containing methods that call graphical user interface generator 750 and/or a virtual jog wheel controller 760. While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing", "identifying", "causing", "comparing", "entering", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

We claim:

1. A method comprising:
    presenting a graphical user interface to be displayed for navigating a set of media elements, the graphical user interface comprising a playlist area to display the set of media elements, a media playback area for playing a first media element from the set of media elements, a virtual jog wheel, and a slider bar with a time scrubber wherein the set of media elements are video files or audio files, wherein the slider bar corresponds to a total playing time of the set of media elements, and the time scrubber corresponds to a current playback position of the set of media elements;
    detecting an input corresponding to a rotational movement of a touch object relative to the virtual jog wheel;

determining a rate of the rotational movement of the touch object relative to the virtual jog wheel;
in response to determining the rate of the rotational movement does not exceed a threshold, presenting, by a processing device, a continuous navigation of the set of media elements as a single entity in the media playback area, wherein the continuous navigation comprises starting prior to an end point in the first media element of the set of media elements and moving to a position subsequent to a starting point in a second media element of the set of media elements; and
in response to determining the rate of the rotational movement exceeds a threshold, transitioning from a single media element scrub mode to a choose media element mode, wherein the choose media element mode allows a user to switch from one media element to another media element in the set of media elements, and wherein the transitioning to the choose media element mode includes replacing the slide bar with a set of thumbnail images, each thumbnail image of the set of thumbnail images corresponding to a respective media element of the set of media elements.

2. The method of claim 1, wherein the graphical user interface comprises a slider bar associated with the set of media elements.

3. The method of claim 2, wherein the rotational movement of the touch object relative to the virtual jog wheel in the single media element scrub mode causes a time scrubber representing the current position within the set of media elements to move along the slider bar.

4. The method of claim 1, wherein a direction of the rotational movement determines a navigation direction relative to the set of media elements while in the single media element scrub mode.

5. The method of claim 1, wherein the set of media elements are concatenated to form a composite navigable set of media elements.

6. The method of claim 1, further comprising:
determining a direction of the rotational movement of the touch object; and
in response to determining the direction is a first direction, causing, by the processing device, a navigation of the set of media elements in the media playback area, wherein the navigation is from the first media element of the set of media elements to a second media element of the set of media elements at a first rate.

7. The method of claim 6, further comprising:
in response to determining the direction is a second direction, causing, by the processing device, the navigation of the set of media elements in the media playback area from the second media element to a third media element at a second rate, wherein the second rate is different than the first rate.

8. A system comprising:
a memory; and
a processing device, operatively coupled to the memory, to:
present a graphical user interface to be displayed for navigating a set of media elements, the graphical user interface comprising a playlist area to display the set of media elements, a media playback area for playing a first media element from the set of media elements, a virtual jog wheel, and a slider bar with a time scrubber wherein the set of media elements are video files or audio files, wherein the slider bar corresponds to a total playing time of the set of media elements, and the time scrubber corresponds to a current playback position of the set of media elements;
detect an input corresponding to a rotational movement of a touch object relative to the virtual jog wheel;
determine a rate of the rotational movement of the touch object relative to the virtual jog wheel;
in response to determining the rate of the rotational movement does not exceed a threshold, present a continuous navigation of the set of media elements as a single entity in the media playback area, wherein the continuous navigation comprises starting prior to an end point in the first media element of the set of media elements and moving to a position subsequent to a starting point in a second media element of the set of media elements; and
in response to determining the rate of the rotational movement exceeds a threshold, transition from a single media element scrub mode to a choose media element mode, wherein the choose media element mode allows a user to switch from one media element to another media element in the set of media elements, and wherein the transitioning to the choose media element mode includes replacing the slide bar with a set of thumbnail images, each thumbnail image of the set of thumbnail images corresponding to a respective media element of the set of media elements.

9. The system of claim 8, wherein the graphical user interface comprises a slider bar associated with the set of media elements.

10. The system of claim 9, wherein the rotational movement of the touch object relative to the virtual jog wheel in the single media element scrub mode causes a time scrubber representing the current position within the set of media elements to move along the slider bar.

11. The system of claim 8, wherein a direction of the rotational movement determines a navigation direction relative to the set of media elements while in the single media element scrub mode.

12. The system of claim 8, wherein the set of media elements are concatenated to form a composite navigable set of media elements.

13. The system of claim 8, wherein the processing device is further to:
determine a direction of the rotational movement of the touch object; and
in response to determining the direction is a first direction, cause a navigation of the set of media elements in the media playback area, wherein the navigation is from the first media element of the set of media elements to a second media element of the set of media elements at a first rate.

14. The system of claim 13, wherein the processing device is further to:
in response to determining the direction is a second direction, cause the navigation of the set of media elements in the media playback area from the second media element to a third media element at a second rate, wherein the second rate is different than the first rate.

15. A non-transitory computer-readable storage medium having instructions stored therein, which when executed, cause a processing device to:
present a graphical user interface to be displayed for navigating a set of media elements, the graphical user interface comprising a playlist area to display the set of media elements, a media playback area for playing a first media element from the set of media elements, a virtual jog wheel, and a slider bar with a time scrubber wherein the set of media elements are video files or audio files, wherein the slider bar corresponds to a total playing time of the set of media elements, and the time scrubber corresponds to a current playback position of the set of media elements;

detect an input corresponding to a rotational movement of a touch object relative to the virtual jog wheel;

determine a rate of the rotational movement of the touch object relative to the virtual jog wheel;

in response to determining the rate of the rotational movement does not exceed a threshold, present a continuous navigation of the set of media elements as a single entity in the media playback area, wherein the continuous navigation comprises starting prior to an end point in the first media element of the set of media elements and moving to a position subsequent to a starting point in a second media element of the set of media elements; and in response to determining the rate of the rotational movement exceeds a threshold, transition from a single media element scrub mode to a choose media element mode, wherein the choose media element mode allows a user to switch from one media element to another media element in the set of media elements, and wherein the transitioning to the choose media element mode includes replacing the slide bar with a set of thumbnail images, each thumbnail image of the set of thumbnail images corresponding to a respective media element of the set of media elements.

16. The non-transitory computer-readable storage medium of claim 15, wherein the graphical user interface comprises a slider bar associated with the set of media elements.

17. The non-transitory computer-readable storage medium of claim 16, wherein the rotational movement of the touch object relative to the virtual jog wheel in the single media element scrub mode causes a time scrubber representing the current position within the set of media elements to move along the slider bar.

18. The non-transitory computer-readable storage medium of claim 15, wherein a direction of the rotational movement determines a navigation direction relative to the set of media elements while in the single media element scrub mode.

19. The non-transitory computer-readable storage medium of claim 15, wherein the processing device is further to:

determine a direction of the rotational movement of the touch object; and in response to determining the direction is a first direction, cause a navigation of the set of media elements in the media playback area, wherein the navigation is from the first media element of the set of media elements to a second media element of the set of media elements at a first rate.

20. The non-transitory computer-readable storage medium of claim 19, wherein the processing device is further to:

in response to determining the direction is a second direction, cause the navigation of the set of media elements in the media playback area from the second media element to a third media element at a second rate, wherein the second rate is different than the first rate.

* * * * *